(12) United States Patent
Ievdokymenko (10) Patent No.: US 12,299,255 B2
(45) Date of Patent: May 13, 2025

(54) ADAPTIVE CATEGORIZATION OF ELECTRONIC COMMUNICATIONS AND PRIORITIZATION OF CATEGORIES

(71) Applicant: GOOGLE LLC, Mountain View, CA (US)

(72) Inventor: Dmytro Ievdokymenko, Rancho Santa Margarita, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/213,622

(22) Filed: Jun. 23, 2023

(65) Prior Publication Data

US 2024/0427473 A1    Dec. 26, 2024

(51) Int. Cl.
G06F 3/0482     (2013.01)
G06F 9/451      (2018.01)
G06F 16/28      (2019.01)
H04L 51/42      (2022.01)

(52) U.S. Cl.
CPC ............ *G06F 3/0482* (2013.01); *G06F 9/451* (2018.02); *G06F 16/287* (2019.01); *H04L 51/42* (2022.05)

(58) Field of Classification Search
CPC ...... G06F 3/0482; G06F 9/451; G06F 16/287; H04L 51/42
See application file for complete search history.

(56) References Cited

U.S. PATENT DOCUMENTS

| | | | |
|---|---|---|---|
| 9,946,789 B1* | 4/2018 | Li | G06F 16/93 |
| 11,830,270 B1* | 11/2023 | Bui | G06V 30/41 |
| 2018/0032897 A1* | 2/2018 | Cao | G06N 20/10 |
| 2020/0034752 A1* | 1/2020 | Luo | G06Q 10/107 |
| 2020/0311120 A1 | 10/2020 | Zhao | |
| 2024/0111396 A1* | 4/2024 | Vandivere | G06F 40/106 |

OTHER PUBLICATIONS

Konrad Wrona et al., Assisted content-based labelling and classification of documents, May 1, 2016, IEEE Xplore, pp. 1-7 (Year: 2016).*

(Continued)

*Primary Examiner* — Tam T Tran
(74) *Attorney, Agent, or Firm* — Gray Ice Higdon (57) ABSTRACT

Implementations generate adaptive labels for a variety of different documents in furtherance of re-organizing the documents and/or otherwise simplifying a presentation of at least a subset of the documents at an application interface. A label that is generated for a given document can be based on content of the document, which can be processed using one or more different artificial intelligence techniques to determine the label. A set of labels generated for the variety of different documents can be utilized for organizing a subset of the documents that are associated with a particular user. In these and other manners, when the user accesses an application, the user can more readily sift through their documents in a more computationally efficient manner, thereby preserving computational resources being consumed to present the documents to the user. For example, as opposed to a user being presented with the same static labels for filtering and/or sorting over time, the labels can adapt over time and adapt in accordance with the contents of underlying emails or other documents.

20 Claims, 6 Drawing Sheets

(56) References Cited

OTHER PUBLICATIONS

Abu Nowshed Chy et al., Bangla News Classification using Naive Bayes Classifier, Mar. 1, 2014, International Conference Computer and Information Technology, pp. 366-371 (Year: 2014).*

Rogerio C. P. Fragoso et al., Class-dependent feature selection algorithm for text categorization, Jul. 1, 2016, International Joint Conference on Neural Networks, pp. 3508-3515 (Year: 2016).*

Rogerio C. P. Fragoso et al., A method for automatic Determination of the Feature Vector Size for Text Categorization, Oct. 1, 2016, Brazilian Conference on Intelligent Systems, pp. 259-264 (Year: 2016).*

European Patent Office; International Search Report and Written Opinion issued in Application No. PCT/US2024/035029; 14 pages; dated Oct. 10, 2024.

* cited by examiner

ADAPTIVE CATEGORIZATION OF ELECTRONIC COMMUNICATIONS AND PRIORITIZATION OF CATEGORIES

BACKGROUND

Email applications, cloud storage applications, and/or other applications or websites can provide interfaces through which a user can view their received emails, files, search results, and/or other listings of information. Those interfaces often include functionality for viewing and/or arranging any documents, files, and/or other information according to a static quantity of sorting or filtering options.

As one example, an email interface can include static sorting and/or filtering options such as ones corresponding to "promotions", "social", and "travel" labels. Selecting one of those options can cause corresponding email(s) (if any) to be presented more prominently (i.e., when a sorting option) or exclusively (i.e., when a filtering option). An email can be determined to correspond to a "promotion", "social", or "travel" label (or other label(s)) based on processing the email (e.g., a sender and/or subject thereof) utilizing one or more machine learning and/or heuristic processes.

However, the sorting and/or filtering options that are available in the email interface for a given user remain static over time, even as topic(s) of underlying emails that are accessible in the email interface evolve substantially. For example, a "travel" sorting option can be provided despite to a user in their email interface there not being any, or only de minimis, emails of the user that correspond to travel. As another example, a user can begin to receive a significant quantity of a certain type of emails (e.g., job related emails as the user is searching for a job) and, despite this, no "job search" sorting or filtering option will be presented when it is not a default static option. Moreover, the sorting and/or filtering options that are available in email interfaces of each of multiple users can be the same, despite the underlying emails for each of those users being drastically different.

Having static filtering options can result in various computational and/or network inefficiencies. For example, rendering an option for a static label, despite there not being any emails (or other document/information) that correspond to that static label, unnecessarily utilizes screen real estate, making interaction with a corresponding graphical interface more difficult and more time consuming. This can be particularly pronounced on mobile phones, smart watches, or other devices with limited screen real estate. As another example, failing to render an option for a pertinent label can prevent filtering and/or sorting of emails or other documents that conform to that label. This can result in multiple searches needing to be performed in an attempt to identify relevant emails and/or extensive review of/scrolling through multiple emails in an attempt to identify relevant emails.

SUMMARY

Implementations set forth herein relate to generating adaptive labels for a variety of different documents in furtherance of re-organizing the documents and/or otherwise simplifying a presentation of at least a subset of the documents at an application interface. A label that is generated for a given document can be based on content of the document, which can be processed using one or more different artificial intelligence techniques to determine the label. A set of labels (i.e., categories) generated for the variety of different documents can be utilized for organizing a subset of the documents that are associated with a particular user. In these and other manners, when the user accesses an application (e.g., an email application, web search application, file explorer application, etc.), the user can more readily sift through their documents in a more computationally efficient manner, thereby preserving computational resources (e.g., memory, processor resources, network bandwidth, etc.) being consumed to present the documents to the user.

For example, as opposed to a user being presented with the same static labels for filtering and/or sorting over time, the labels can adapt over time and adapt in accordance with the contents of underlying emails or other documents. For example, labels that are no longer relevant (e.g., due to deletion of emails) can be prevented from being rendered, while labels that have become relevant (e.g., due to at least a threshold quantity of new emails corresponding to such labels) can be rendered. As another example, disparate labels can be presented to a first user and a second user at a given time, in response to first documents of the first user varying from second documents of the second user at the given time.

As a particular example, a document service can employ various storage devices for securely storing and backing up documents that can be accessed over the internet (e.g., through web searches, email clients, etc.). Contents of the documents can be processed, with prior permission from users and/or document owners, using one or more machine learning and/or artificial intelligence techniques for generating categorical labels that can be assigned to each document. For example, contents of the documents can be processed to characterize content for each respective document with one or more words or phrases, which can correspond to a respective category for a respective document. Each category can be associated with a probability that the word(s) or phrase(s) describing a particular category accurately defines a particular document. In some implementations, a set of categories can be identified as having corresponding probabilities that satisfy a threshold probability. The set of categories can then be utilized to classify the existing documents and any subsequently created documents.

Furthering the aforementioned example, the document service can be an email platform that has numerous users, and each user can access their subset of documents (i.e., emails) when they sign into a client application of the email platform. As an inbox of a user receives email messages, each message can be assigned a category from the set of categories, with prior permission from the user, and based on the subject matter of the email messages. When the subset of email messages of a particular user has been labeled with a subset of category labels of the set of categories, the email messages can be graphically represented at the client application according to the category labels. For example, when the user signs into the client application, a plurality of selectable elements can be rendered, at a graphical user interface (GUI), with indications of the particular category that each selectable element represents. In some implementations, the email messages can optionally be omitted from GUI until a user selects a particular selectable element to review email messages of a particular category. In response to a user selecting a particular category, the client application can cause additional selectable elements to be rendered, and those additional selectable elements can represent email messages that have been labeled as being relevant to the particular category.

In some implementations, the categories that are selected for representing a subset of documents for a particular user can have a corresponding hierarchy of categories. Therefore, each document of the subset of documents can be assigned one or more categories, and each category can be prioritized over another category, and/or not prioritized over a different category. In some implementations, when a user accesses a client application for viewing a GUI with an arrangement of selectable elements, each selectable element can represent a particular category and can be prioritized according to the hierarchy of categories. In this way, a GUI that would otherwise be consumed with various documents that would take the user extensive time and energy to scan through, can be replaced with a simplified GUI of selectable elements representing categories of those various documents.

In some implementations, a set of categories from which a category is selected for a particular document can be generated based on processing of document content of a set of documents to determine a limited set of categories that the set of documents are related to. For example, a probability that a particular category is relevant to a particular document can be determined (e.g., using natural language understanding). When the probability satisfies a threshold probability, the particular category can be selected to be part of the set of categories from which categories for subsequently-created documents can be assigned. For example, an email that provides an itinerary for an international trip can be assigned a category of "travel" because of the probability of "travel" satisfying the threshold probability. Therefore, the categorical label, "Travel," would be included in the set of categories. However, although another category of "ticket" may be relevant to the same email, the category label of "Ticket" may not be included in the set of categories because the probability determined for "ticket" does not satisfy the probability threshold.

In some implementations, a user can affect the hierarchy of categories, thereby causing the presentation of selectable elements at the GUI to be adapted according to preferences of the user. This can provide for more efficient interactions with large quantities of documents, thereby preserving resources of a device and/or network that a user is accessing. For example, a user can delete documents through the client application, and cause a quantity of documents assigned to a particular category to be reduced to below a threshold value. As a result, a selectable element and/or other GUI element representing the particular category can be omitted from the GUI of the client application. This can simplify the GUI for the user, especially in situations in which the deleted documents relate to a category that is of declining interest to the user—as opposed to the deletion of the documents, and/or reduction in documents of a category, not influencing an organization of a GUI for a document-organizing application.

In some implementations, categories can be created and/or modified by a user, for example, when a categorical label is not accurate and/or has not been assigned to a particular document. Alternatively, or additionally, a category for a particular document can change as a context of the document, the user, and/or the client application changes over time. In some implementations, the client application can select a category, such as "Work," for a subset of documents associated with a user, but then change the categories for the subset of documents to include "First Job" and "Second Job," which can replace the category "Work." As a result, the subset of documents will include a first set of documents categorized as "First Job," and a second set of documents categorized as "Second Job." In some implementations, such a change can occur in response to the user modifying the category for a particular document within the subset of documents (e.g., Changing "Work" to "First Job"); and the client application can infer the changes that should occur for the other documents in the subset of documents. In other words, one or more machine learning models and/or heuristic processes can be utilized to respond to the manual category change by autonomously modifying categories assigned to the other documents. For example, when the category "Work" is modified to "First Job," probabilities for other categories can be re-calculated based on the modification, and the recalculation can result in the category "Second Job" satisfying a probability threshold and, optionally, the category "Work" not satisfying the probability threshold. The category "Second Job" can then be considered a candidate category for documents associated with the user, and the category "Work" can no longer be considered a candidate category for classifying user documents.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
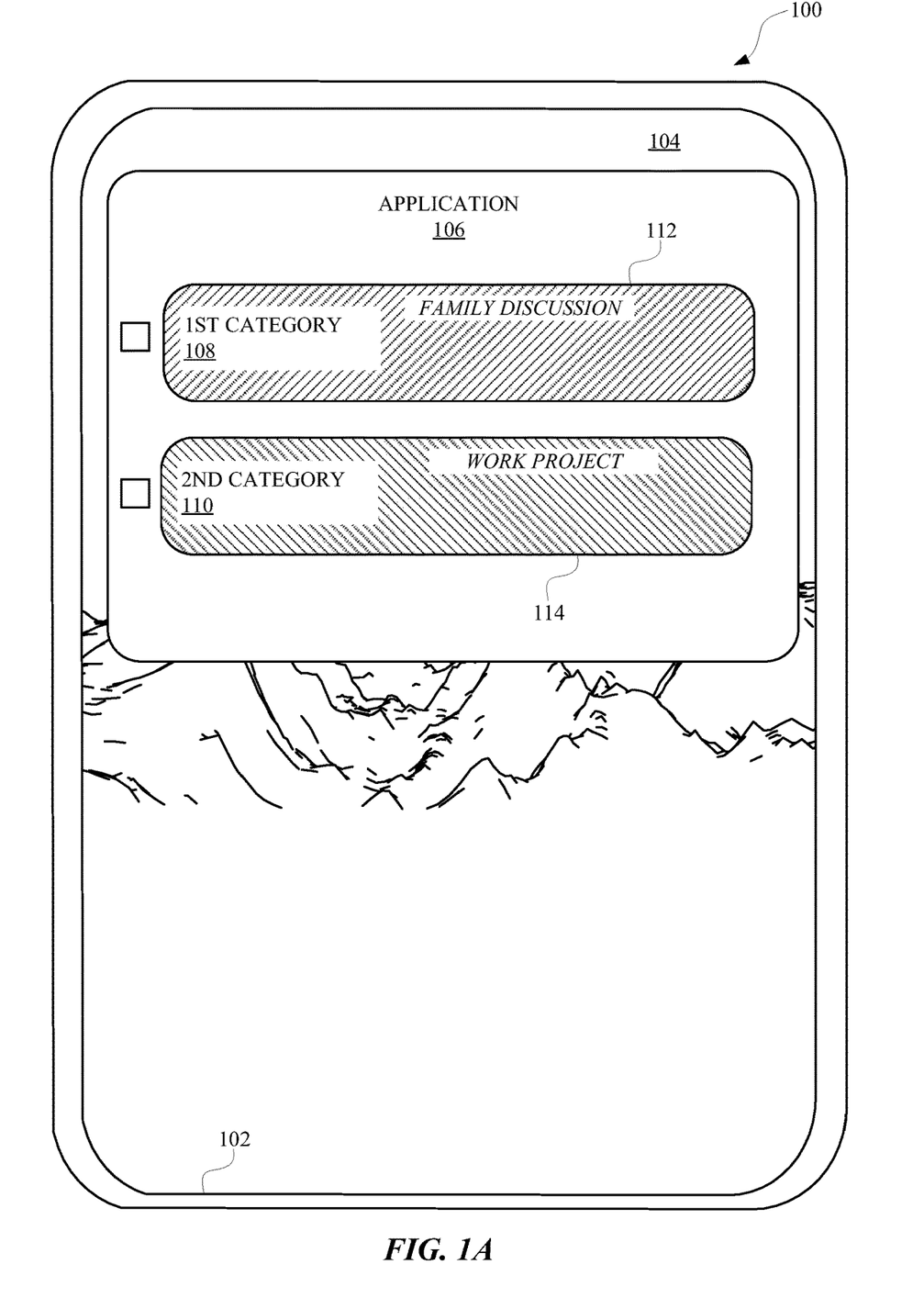
FIG. 1A and FIG. 1B illustrate views of a computing device accessing an application that organizes electronic communications and/or other data for rendering at a display interface according to categories that are selected for a corpus of electronic communications for a user.
Figure 1B:
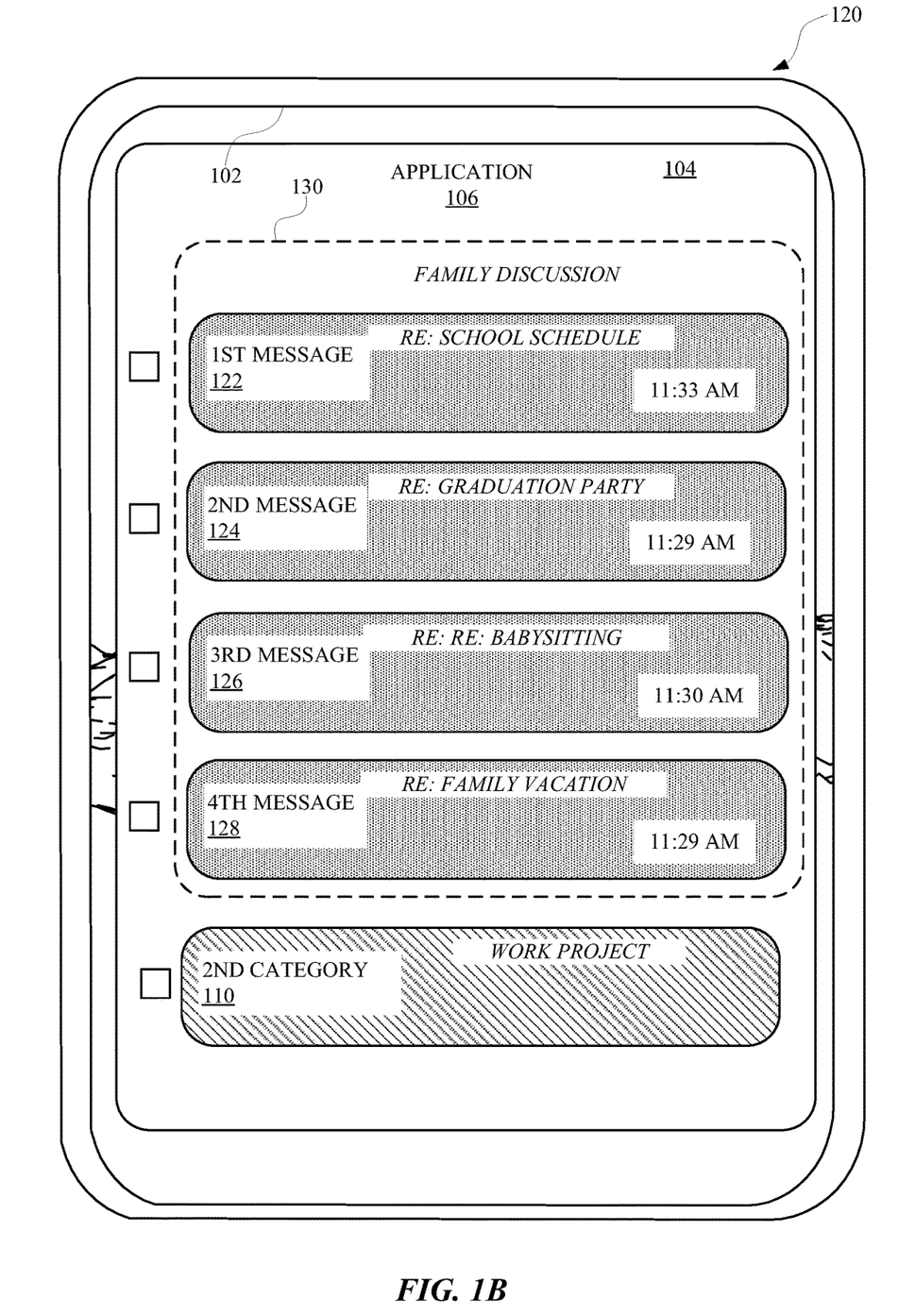

FIG. 1A and FIG. 1B illustrate a view 100 and a view 120 of a computing device 102 accessing an application 106 that organizes documents and/or other data for rendering at a display interface 104 according to categories selected and/or generated for and/or by a user. The application 106 renders the documents in this way to achieve technical benefits in view of many technical deficiencies of other available applications. For example, other messaging applications may categorize certain messages according to a limited number of pre-determined categories, such as "Spam," "Promotional," and "Personal." These categories may be manually created by developers of these applications, which may not provide any functionality for creating other categories. However, when such applications do provide functionality for creating other categories, the creation of additional categories often requires a user to manually create the additional categories and manually assign documents to those categories. As a result, users may be spending a significant portion of time manually categorizing documents, which may unnecessarily consume resources, such as network storage and network bandwidth.

The implementations set forth herein can provide applications with an ability to autonomously generate and/or select a set of document categories for a user, and assign a subset of those categories to a subset of documents for the user. In this way, when the user accesses their respective application 106 to view and/or otherwise interact with their associated documents (e.g., email messages), the documents can be initially organized according to prioritization of the categories. For example, and as illustrated in FIG. 1A, the subset of categories for a particular user can include a 1st category 108 (e.g., a "Family Discussion" category) and a 2nd category 110 (e.g., a "Work Project" category). Each of these categories can be generated autonomously by processing content of documents for a population of users, with prior permission from those users. These two categories can then be assigned to documents of the given user because of the relevance of documents of the given user to those two categories.

When the given user accesses the application 106 via their computing device 102, the application 106 can cause a first selectable element 112 and a second selectable element 114 to be rendered at a display interface 104 of the computing device—in lieu of rendering all documents without regard to their category. This can prove to be a more efficient use of resources at the computing device 102, considering the categories of a subset of documents would be initially rendered, rather than elements for the entire subset of documents. In some implementations, the application 106 can avoid rendering selectable elements for certain categories that have not been assigned to a threshold number of documents. However, as new documents are created and/or otherwise assigned to omitted categories, the application 106 can render a different set of selectable elements at a different time, thereby dynamically adapting the GUI to the changing landscape of the content of the corpus of electronic communications associated with a user. When the given user selects a particular selectable element, such as the first selectable element 112, selectable elements for the documents assigned to the first category can be rendered at the display interface 104, as illustrated in view 120 of FIG. 1B.

FIG. 1B illustrates an example of an interface that can be rendered when the given user selects the selectable element 112 for a given category, to cause additional selectable elements 130 to be rendered for a particular category. The additional selectable elements 130 can be, for example, messages that are determined to be relevant to the $1^{st}$ category 108 (e.g., "Family Discussion"), based on a determined probability for each of the messages (e.g., $1^{st}$ message 122, $2^{nd}$ message 124, $3^{rd}$ message 126, and $4^{th}$ message 128). In some implementations, other selectable elements corresponding to other categories can remain rendered at the display interface 104, after the given user selects a particular category. For example, and as illustrated in FIG. 1B, the $2^{nd}$ category 110 (e.g., "Work Project") can remain selectable at the display interface 104 via the second selectable element 114. In some implementations, in response to the given user selecting the second selectable element 114, the documents associated with the $1^{st}$ category 108 can be omitted from the display interface 104, and other selectable elements for other documents associated with the 2nd category 110 can be rendered at the display interface 104. Thereafter, interactions with documents assigned the 2nd category 110 can result in changes to prioritization of the 2nd category 110 by the application 110, thereby modifying the presentation of selectable elements at the display interface 104.

Figure 2:
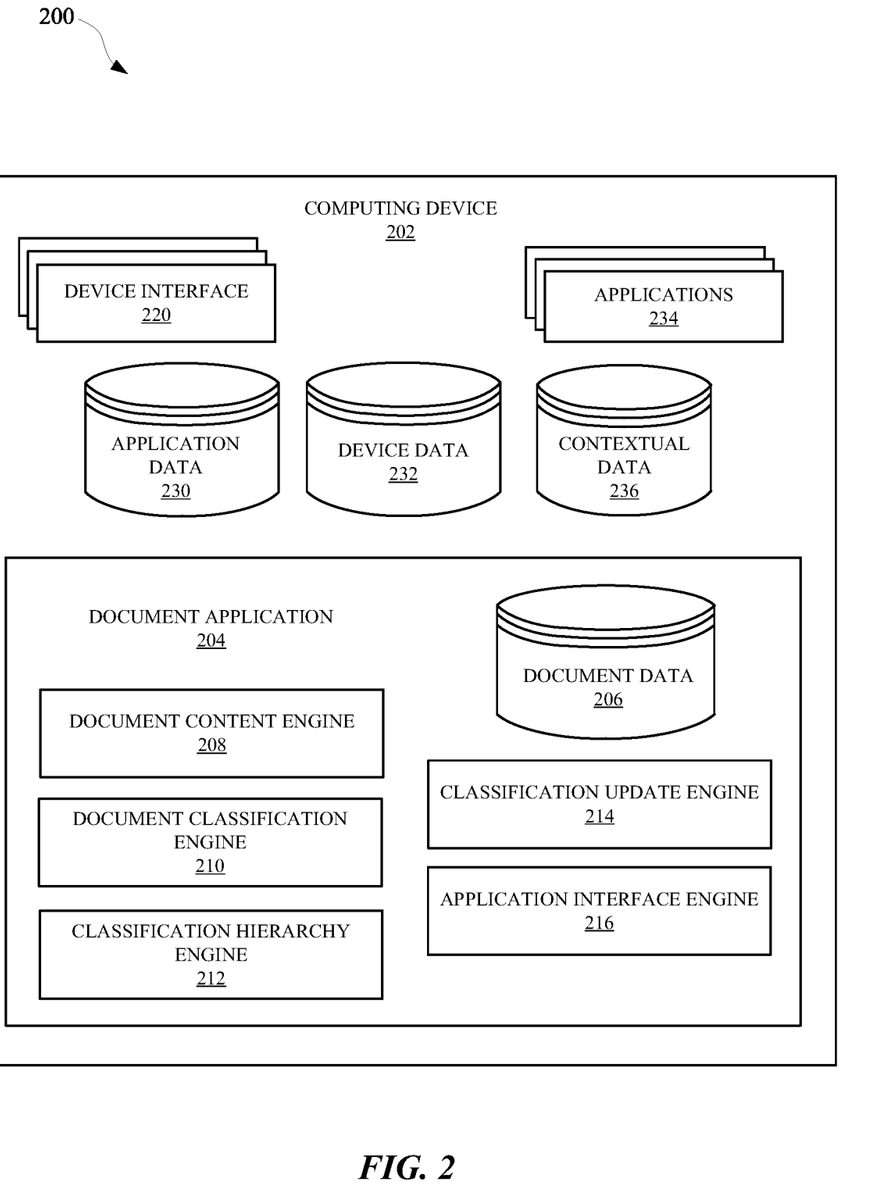
FIG. 2 illustrates a system for proactively and autonomously selecting categories for electronic communications for a user and assigning a subset of the categories to a subset of the electronic communications.

FIG. 2 illustrates a system 200 for proactively and autonomously creating category labels for documents for one or more users, and assigning a subset of the categories to a subset of documents for the one or more users. The document application 204 can operate at one or more computing devices, such as a computing device 202 and/or a server device. A user can interact with the document application 204 via device interface(s) 220, which can be a keyboard, a mouse, a microphone, a camera, a touch screen display, a user interface, and/or any other apparatus capable of providing an interface between a user and an application. The computing device 202 can include a display device, which can be a display panel that includes a touch interface for receiving touch inputs and/or gestures for allowing a user to control applications 222 of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be void of a camera, but can optionally include one or more other sensors.

The computing device 202 and/or other third party client devices can be in communication with a server device over a network, such as the internet. Additionally, the computing device 202 and any other computing devices can be in communication with each other over a local area network (LAN), such as a Wi-Fi network. The computing device 202 can offload computational tasks to the server device in order to conserve computational resources at the computing device 202. For instance, the server device can host the document application 204, and/or computing device 202 can transmit inputs received at one or more device interfaces 220 to the server device. However, in some implementations, the document application 204 can be hosted at the computing device 202, and various processes that can be associated with document application operations can be performed at the computing device 202.

In various implementations, all or less than all aspects of the document application 204 (e.g., a web application, a browser, a messaging application, a word processing application, and/or any other application or module) can be implemented on the computing device 202. In some of those implementations, aspects of the document application 204 are implemented via the computing device 202 and can interface with a server device, which can implement other aspects of the document application 204. The server device can optionally serve a plurality of users and their associated document applications via multiple threads. In implementations where all or less than all aspects of the document application 204 are implemented via computing device 202, the document application 204 can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the computing device 202 can include one or more applications 234 which can be provided by a third-party entity that is different from an entity that provided the computing device 202 and/or the document application 204. Application data 230 and/or any other data (e.g., device data 232) can be accessed by the document application 204 to generate contextual data 236, which can characterize a context in which a particular application 234 and/or device is executing, and/or a context in which a particular user is accessing the computing device 202, accessing an application 234, and/or any other device or module. While one or more applications 234 are executing at the computing device 202, the device data 232 can characterize a current operating state of each application 234 executing at the computing device 202. Furthermore, the application data 230 can characterize one or more features of an executing application 234, such as content of one or more graphical user interfaces being rendered at the direction of one or more applications 234.

In some implementations, the document application 204 can include a document content engine 208 that can process content of documents, with prior permission from any associated users and/or document owners, to determine any subject matter that each document is directed to. The documents that are processed by the document content engine 208 can include a plurality of documents associated with a plurality of users that have access to various instances of the document application 204. For example, the document application 204 can be a browser and the documents can include web pages that are searchable via the browser. Alternatively, or additionally, the document application 204 can include a word processing application and/or an email application, and the documents can include electronic files and/or messages that are accessible via the document application 204. In some implementations, determining subject matter of a respective document can include processing data that embodies the content of the document, and/or processing contextual data 236 that can be associated with the document. For example, one or more trained machine learning models (e.g., a large language model (LLM)) can be utilized to generate natural language content and/or an embedding that represents the content of a respective document. When natural language content is utilized to summarize the document, embeddings can be generated for such summarizing content for each document of a set of documents, and the embeddings can be mapped to a latent space for identifying clusters (e.g., via K-Means) of related documents of the set of documents. In this way, when another document is created as part of the set of documents, this other document can be processed to generate an embedding, and a distance in latent space between the embedding and a particular cluster can indicate the classification for this other document.

In some implementations, the document application 204 can include document classification engine 210 that can process the summarizing content and/or embeddings to determine a set of categories for the set of documents. In other words, the document classification engine 210 can perform one or more clustering techniques to identify related groups of documents and generate unique categorical labels for each cluster. In this way, any subset of documents associated with a particular user can be assigned categories that are selected from the set of categories for the entire set of documents. In some implementations, categories can be selected according to a supervised or unsupervised learning process. For example, a model trained from a labeled data set can be utilized to assign a unique label to a particular cluster of embeddings representing a subset of documents. Alternatively, or additionally, a language model trained to generate one or more terms for a cluster of documents can be utilized to generate a finite number of terms that can represent a set of categories for classifying the set of documents.

When the set of categories have been determined for the set of documents, a classification hierarchy engine 212 can be utilized to determine a hierarchy of categories for a given user. For example, the classification hierarchy engine 212 can prioritize a particular category of documents of a subset of documents for a user according to how many documents of the subset are assigned that particular category. Alternatively, or additionally, the classification hierarchy engine 212 can prioritize each particular category of documents according to which category has the most documents that the user has most recently (e.g., within a threshold duration of time) accessed and/or modified (e.g., responded to an email). Alternatively, or additionally, the classification hierarchy engine 212 can prioritize each particular category of documents according to how many other persons are associated with documents of each category. In this way, the category that has the most documents that are associated with the most users (e.g., invitations, group messages, etc.) can be prioritized over documents that are associated with less users.

In some implementations, the computing device 202 can include an application interface engine 216 that can render a subset of documents for a user according to the hierarchy (i.e., priority) of the categories assigned to the subset of the documents. For example, when the user accesses the document application 204, the application interface engine 216 can cause selectable elements to be rendered at the device interface 220 to represent a subset of categories. The subset of categories can include, for example, a first category that has been assigned to a greater number of documents than a second category of the subset. Additionally, the device interface 220 can be controlled to omit any category that has not been assigned to a threshold number of documents.

In some implementations, a classification update engine 214 can cause any assignment of a category of a document to be modified according to how a user or users interact with the document. For example, the classification update engine 214 can determine that a particular document has been deleted and, in response, the classification update engine 214 can cause the category for that particular document to no longer be rendered at the device interface 220. In some implementations, the omission of this particular document in response to the deletion can be based on the category no longer having a threshold number of documents, the user expressing an ongoing disinterest in documents of that category, and/or any other information that can indicate the category should not be presented with the same priority. In some implementations, the classification update engine 214 can modify a classification of one or more documents in response to a user editing a category label for a document and/or interacting with a document (e.g., responding to an email with certain responsive content). In some implementations, the editing of such a label and/or interacting with the document can cause a re-weighting of categories for the subset of documents for the user, and any changes in weights of factors for assigning a category to a document can result in the change in the category for the document. For example, when a user modifies a category of a document from "Work" to "Side Project," other documents of a subset of documents associated with the user can undergo further processing by the document classification engine 210 to determine whether other documents should be re-classified. Furthermore, the reclassification process can be performed with the category of "Side Project" having a bias or weight in favor of being assigned over one or more other categories of the set of categories.

Figure 3:
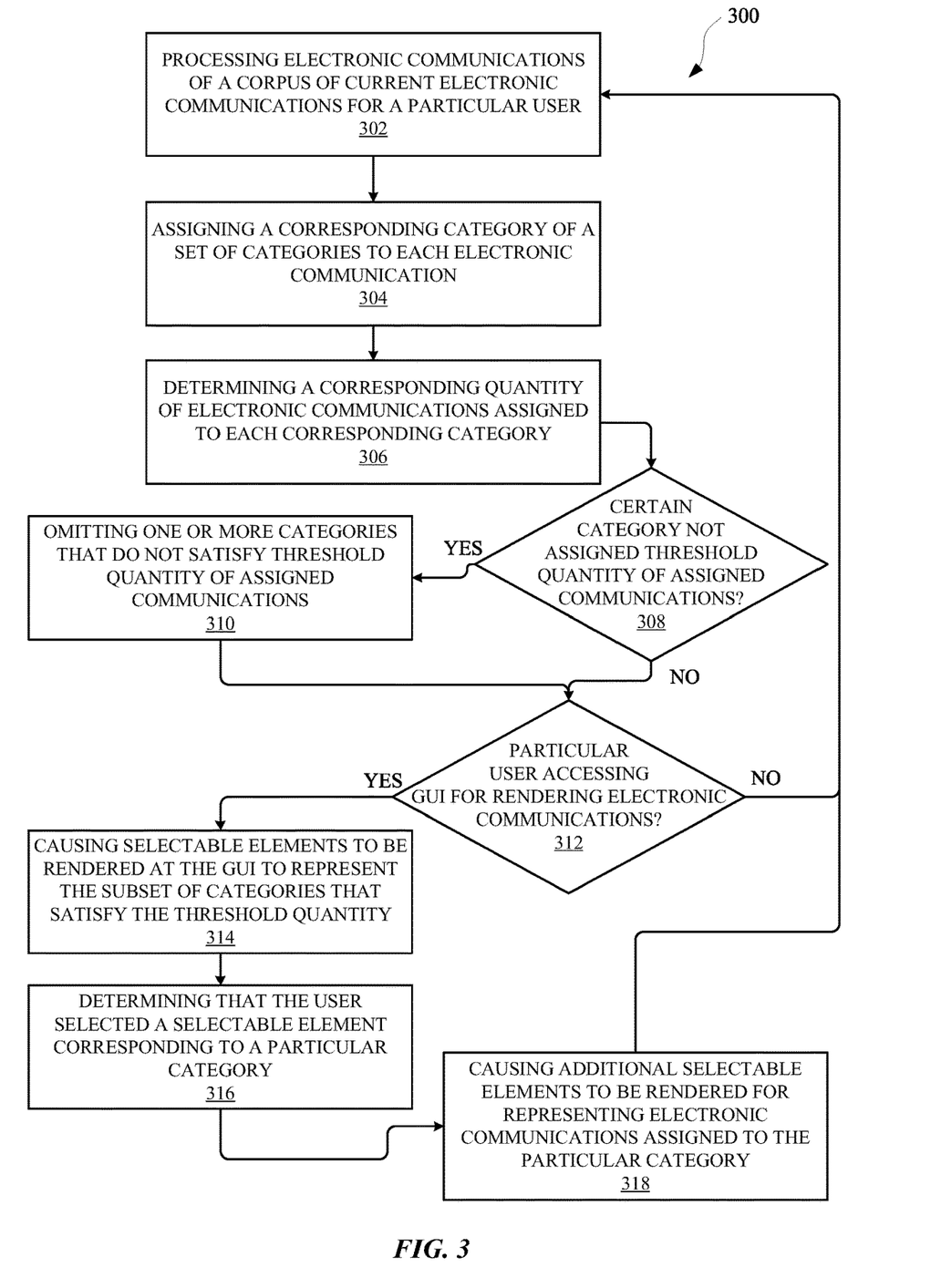
FIG. 3 illustrates a method for categorizing and arranging a subset of electronic communications of a corpus of electronic communications.

FIG. 3 illustrates a method 300 for categorizing and arranging a subset of electronic communications of a corpus of electronic communications. The method 300 can be performed by one or more applications, devices, and/or any other apparatus or module capable of accessing document content.

The method 300 can include an operation 302 of processing electronic communications corresponding to a corpus of current electronic communications associated with a particular user. In some implementations, the electronic communications can include emails, text messages, and/or any other documents or files that can convey information to another user, and the electronic communications can be associated with one or more accounts of the user. In some of those implementations, the electronic communications are all of a certain type (e.g., emails) and/or are all associated with a particular application interface (e.g., an email interface). In some implementations, the processing of the corpus of electronic communications can result in determining a set of categories for the electronic communications, and/or a selection of a set of categories, from an existing set of categories. For example, content of each electronic communication can be processed, with prior permission from the user and/or document owner, using one or more machine learning techniques and/or artificial intelligence techniques, to generate categorical labels and/or select categorical labels.

The method 300 can proceed from the operation 302 to an operation 304 of assigning a corresponding category of the subset of categories to each electronic communication. In some implementations, a category can be assigned to a particular electronic communication because a determined relevance value (e.g., a probability) for the category indicates a priority of the category over any other category relative to the electronic communication. For example, the particular electronic communication can be processed to determine a corresponding reference value for each of multiple categories, and the category assigned to the particular electronic communication based on the corresponding reference value, for the category, being most indicative of relevance.

When each electronic communication has been assigned a corresponding category, the method 300 can proceed from the operation 304 to an operation 306. The operation 306 can include determining, for each category of the set of categories, a corresponding quantity of electronic communications assigned to the category. For example, a number of emails determined to be assigned to a category of "Travel" can be 30, while a separate group of 45 emails can be determined to be assigned to a category of "Acme, Inc."

The method 300 can proceed from the operation 306 to an operation 308, which can include determining whether any category has not been assigned to a threshold quantity of electronic communications. When a particular category has not been assigned to a threshold quantity of electronic communications (e.g., an absolute threshold, or a relative threshold that is relative to how many electronic communications are assigned to certain categories), the method 300 can proceed from the operation 308 to an operation 310, otherwise the method 300 can proceed to an operation 312.

The operation 310 can include omitting one or more categories that do not satisfy the threshold quantity of assigned electronic communications. In some implementations, omitting the one or more categories can include not including the one or more omitted categories as candidate categories when rendering any selectable category elements at a GUI. In other words, when a category has not been assigned to at least a threshold number of electronic communications, the category may not be represented as a selectable element at a GUI, or at least not at a most-prioritized portion of the GUI (e.g., a top-most portion, a left-most portion, a portion with largest font, and/or any other indication of higher priority). In these and other manners, various implementations can select only categories that correspond to the N categories that have been assigned to the largest quantity of electronic communications, where N is an integer greater than one (e.g., three, five, ten, or other value).

The operation 312 can include determining whether a particular user is accessing a GUI for rendering the electronic communications and/or otherwise accessing the electronic communications of the corpus. For example, a user can access the GUI through an application and/or web browser that solicits data from a server or other document storage. When the user is determined to have requested access to the GUI, the method 300 can proceed from the operation 312 to an operation 314. Otherwise, the method 300 can optionally return to the operation 302 and/or any other suitable operation.

The operation 314 can include causing selectable elements to be rendered at the GUI to represent the subset of categories that satisfy the threshold quantity. In these and other manners, no alternative selectable element corresponding to any omitted category would be rendered at the GUI. For example, an alternative selectable element that corresponds to an omitted category can be omitted based on the omitted category not being assigned to any of the electronic communications being assigned to less than a threshold quantity of the communications. In some implementations, the selectable elements can be arranged such that a selectable element for a category with the most assigned electronic communications is prioritized over any other selectable element. Alternatively, or additionally, the selectable elements can be arranged such that a selectable element for a category with the most engagement from the user, and/or other persons, is prioritized over any other selectable element. Such engagement can include GUI inputs to select and/or modify any assigned electronic communications, replies and/or other interactions by other users with respect to the assigned electronic communications, and/or any other form of engagement that can be associated with an electronic communication.

The method 300 can proceed from the operation 314 to an operation 316, which can include determining that the user selected a selectable element corresponding to a particular category assigned to a subset of electronic communications.

In response to the user selecting the selectable element, the method 300 can proceed to an operation 318 of causing additional selectable elements to be rendered for representing electronic communications assigned to the particular category. In some implementations, other selectable elements for other categories can remain rendered at the GUI, or not remain rendered at the GUI, in response to the additional selectable elements being rendered. The user can then select a particular additional selectable element for viewing and/or otherwise interacting with a particular electronic communication, which can optionally affect the category assigned to the particular electronic communication and/or how the selectable elements for the categories and/or electronic communications are rendered at the GUI.

For example, a current corpus of electronic communications for a user can be expanded to have another file or document when the user replies to an email or otherwise creates a new document for the corpus. In response, a change in priority for a first category for a subset of electronic communications can occur because the number of assigned electronic communications for that first category can become greater than a second category for the subset of electronic communications. This change in priority can be exhibited at least at the GUI via re-arrangement of selectable elements that represent the first category and the second category. Alternatively, or additionally, the GUI can be modified in response to a user interaction by rendering one more, or one less, category than the GUI had previously rendered. In other words, the GUI can include a maximum number (e.g., a maximum quantity of N) of selectable elements for the assigned categories, and a particular category represented by a selectable element can be replaced by a different selectable element for a different category, in response to the user interacting with one or more electronic communications.

In some implementations, the method 300 can be repeated as new electronic communications are directed to the user and/or otherwise created. As a result, the new electronic communications would be assigned respective categories of the set of categories, and an updated collection of selectable elements for the categories would be rendered at the GUI. This updated collection of selectable elements would be affected by any deletions of electronic communications by the user, or another user, which could cause a number of assigned electronic communications for a particular category to no longer satisfy the threshold quantity. In some implementations, receipt, deletion, creation, and/or other modification to the corpus of electronic communications can initialize performance of the method 300 and/or one or more operations of the method 300, thereby allowing the assigned categories to be continually and dynamically adapted over time. In some implementations, the user can create their own custom categories, which can add to the set of categories and/or modify existing categories. For example, modifying a category of "Travel" to be "Australia" for a single electronic communication can cause the method 300 to "recalibrate" to the assigned categories for the corpus of available communications. As a result, certain electronic communications can be re-assigned to the category of "Australia," while certain other electronic communications can remain assigned to the category of "Travel."

Figure 4:
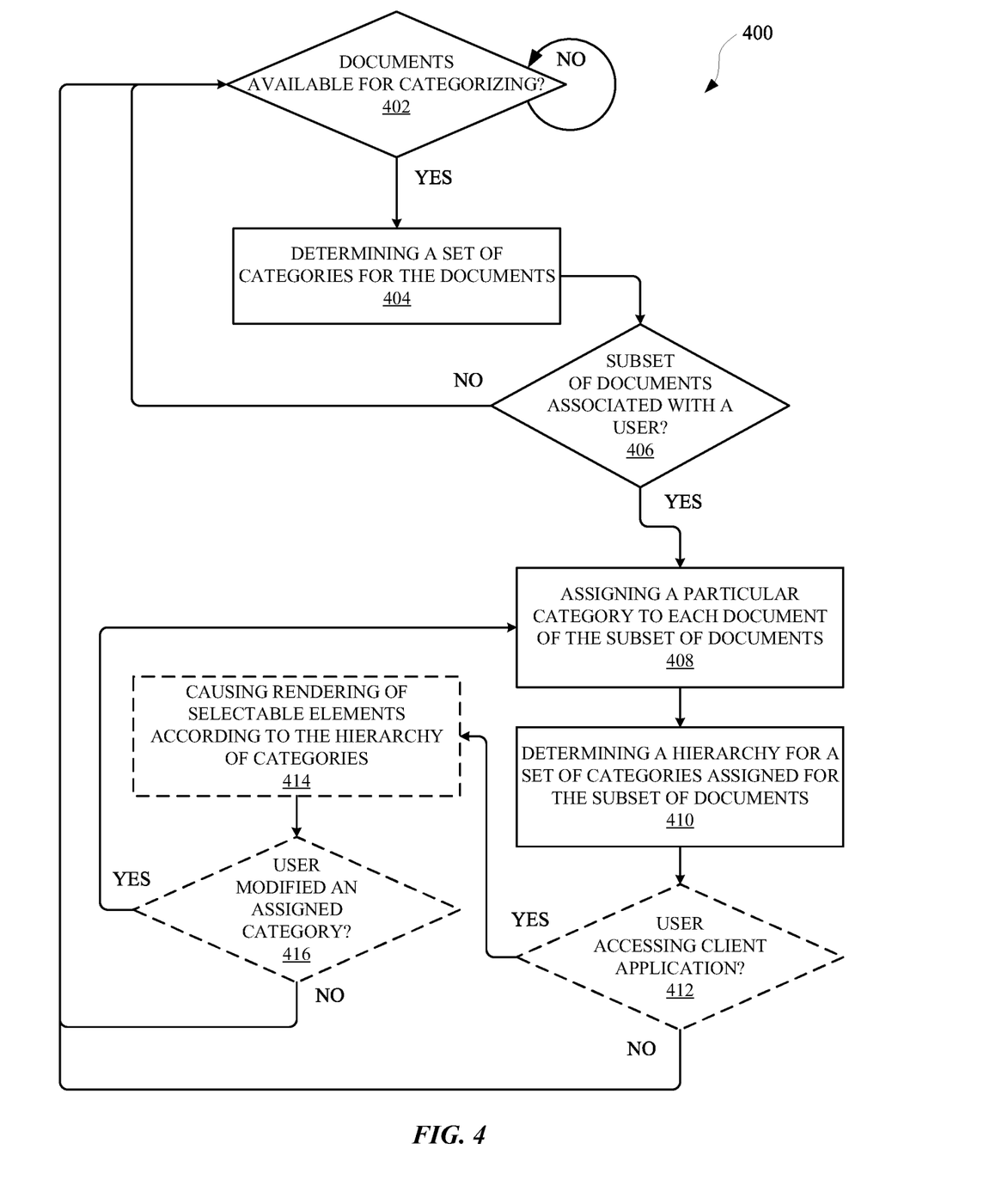
FIG. 4 illustrates a method for categorizing electronic communications (i.e., documents) for simplifying a presentation of the electronic communications for a user and more efficiently managing storage of the electronic communications for improving computer network efficiency.

FIG. 4 illustrates a method 400 for categorizing documents for simplifying a presentation of the documents for a user and more efficiently managing storage of the documents for improving computer network efficiency. The method 400 can be performed by one or more application, devices, and/or any other apparatus or module capable of accessing document content. The method 400 can include an operation 402 of determining whether documents are available for categorizing. The documents can include web data, messages, documents, media files, and/or any other data that can be organized and/or accessed by an application. In some implementations, the operation 402 can be performed at different times, and/or periodically, as users of any associated client applications create and/or share documents. For example, the documents can be web-based word processing files that are stored at a cloud storage. When one or more documents are determined to be available for categorizing, the method 400 can proceed from the operation 402 to an operation 404.

The operation 404 can include determining a set of categories for the documents. The set of categories can be determined using one or more heuristic processes, one or more machine learning models, and/or artificial intelligence techniques. For example, a document of the documents can be processed using natural language understanding to determine one or more words or phrases that characterize the document and/or content of the document, with prior permission from any owner, user, and/or creator of the document. In some implementations, the one or more words or phrases can be stored as categorical labels for the document. Other documents can also be processed to similarly determine one or more other words or phrases that characterize those other documents. The process can continue until there are multiple different categories, and each category is associated with one or more documents. In some implementations, a set of categories can be identified, such that each category of the set of categories is at least associated with, or assigned to, a threshold number of documents. Alternatively, or additionally, the set of categories can be identified such that each category of the set of categories is determined to have a threshold probability of accurately characterizing one or more documents.

The method 400 can proceed from the operation 404 to an operation 406 of determining whether a subset of documents, of the documents, is associated with a user. For example, a subset of the documents can be accessible to a user via a cloud storage application, and the user can have permissions for editing the subset of the documents. When the subset of documents is determined to be associated with the user, the method 400 can proceed from the operation 406 to an operation 408. Otherwise, the method 400 can return to the operation 402 for further determining whether any documents are available for categorizing. The operation 408 can include assigning a particular category to each document of the subset of documents. In other words, a category of the categories determined at the operation 404 can be assigned to a particular document of the subset of documents. In some implementations, the operation 408 can be performed using one or more heuristic processes and/or one or more trained machine learning models.

As an example, content of a particular document of the subset of documents can be processed, with prior permission from the user, to determine candidate categories for assigning to the particular document. Each candidate category can be associated with a probability, and a category having the highest probability (e.g., a most relevant category to the document) can be selected for being assigned to the document. This process can be performed for the entire subset of documents, thereby ensuring that each document of the subset of documents is assigned a category. In some implementations, a document of the subset of document may not be assigned a category until a probability that any category is relevant to the document satisfies a probability threshold. Alternatively, or additionally, a document can be optionally assigned multiple categories when the multiple categories are determined have probabilities of relevance to the document that satisfy a probability threshold. The method 400 can then proceed from the operation 408 to an operation 410 of determining a hierarchy for a set of categories assigned for the subset of documents.

The hierarchy can be determined for presenting the subset of documents to the user in a prioritized manner, such that documents with an estimated highest priority will be presented to the user. In some implementations, determining the hierarchy for the set of categories can include determining the set of categories that were assigned to the subset of documents at the operation 408. A process can then be performed for determining the category that should be prioritized over any other categories in the set of categories. In some implementations, a highest priority category can be one that includes the most documents that have been assigned that particular category. Alternatively, or additionally, the highest priority category can be one that includes the most documents that the user has most recently accessed, edited, created, and/or otherwise expressed interest in. Alternatively, or additionally, the highest priority category can be one that includes the most documents that are accessible to other users, thereby prioritizing documents that may affect the most people. In some implementations, settings for prioritizing certain categories can be controlled autonomously by the application that is performing the categorizing, and/or controlled by the user through an interface of the application.

The method 400 can proceed from the operation 410 to an optional operation 412 of determining whether a user is requesting access to a client application, such as a word processing application for editing a particular document of the subset of documents. When the user is not accessing the word processing application, the method 400 can return to the operation 402. Otherwise, when the user is accessing the word processing application, the method 400 can proceed from the operation 412 to an operation 414. The operation 414 can include causing rendering of selectable elements according to the hierarchy of categories. The rendering of selectable elements can be performed at a client word processing application and/or a browser application, which can render selectable elements that represent the categories assigned to the subset of documents. For example, a category called "Annual Conference" can be assigned to the most documents, and therefore a selectable element labeled "Annual Conference" can be prioritized over any other selectable elements (e.g., an "Annual Conference" GUI element can be rendered at the top and/or left most portion of a GUI). Furthering this example, another category of "Bahamas Trip" can be assigned the second-most number of documents, and therefore a selectable element labeled "Bahamas Trip" can be prioritized just after the "Annual Conference" selectable element. In some implementations, selectable elements for categories can be distinguished by color, shape, text, brightness, and/or any other characteristic that can distinguish GUI elements. When a user selects a GUI element for a particular category, the application can cause additional selectable elements to be rendered, and those additional selectable elements can correspond to the documents assigned that particular category. In other words, selecting a particular selectable element of those additional selectable elements can cause a document to be opened, and that document would have been assigned that particular category.

The method 400 can optionally proceed from the operation 414 to an operation 416, which can include determining whether a user modified an assigned category. In some implementations, the application can retrain according to modifications and/or other feedback provided by the user, thereby resulting in changes to assigned categories. For example, when a category label is changed from "Bahamas Trip" to "Christmas Trip," the user can be considered to have modified the category and the method 400 can proceed from the operation 416 to the operation 408. The operation 408 can then be performed again to re-assign categories to certain documents that were previously assigned the category of "Bahamas Trip." As a result, some of those certain documents can be assigned the category "Christmas Trip," while others of the certain documents can be assigned a different category, at least based on the different category having a higher probability of relevance to those other certain documents. Automatically retraining and/or recategorizing in this way can streamline the organizing of documents, and require less input from the user, which can preserve computational resources such as processing bandwidth, network bandwidth, and battery life for any portable devices. Furthermore, retraining and re-organizing in this way can provide an optimized data storage structure, which can improve memory when buffering data that would be presented to a user who is accessing a computer application to view documents.

Figure 5:
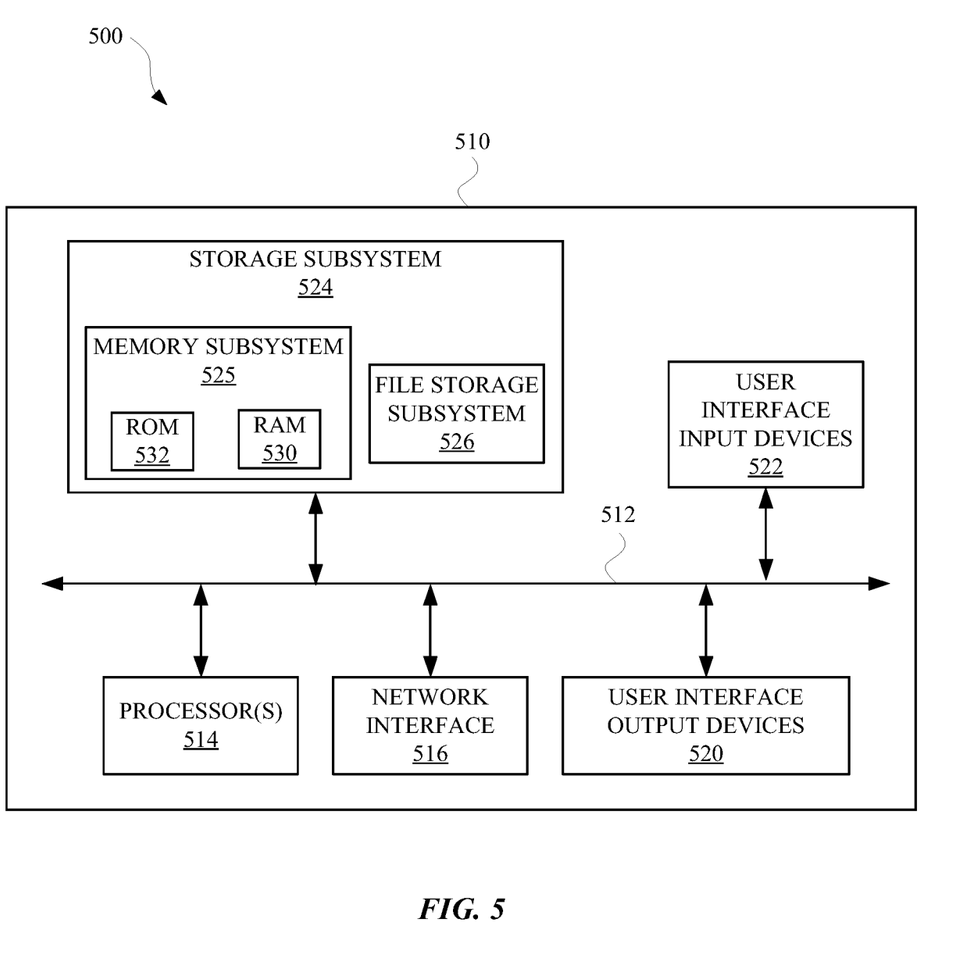
FIG. 5 is a block diagram of an example computer system.

FIG. 5 is a block diagram 500 of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 300, method 300, and/or to implement one or more of system 200, computing device 102, and/or any other application, device, apparatus, and/or module discussed herein.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by hardware processor(s) is provided and includes processing electronic communications of a current electronic communications corpus of a particular user and assigning, based on the processing, a corresponding category, of a set of categories, to each of the electronic communications. The method further includes determining, for each of the corresponding categories, a corresponding quantity of the electronic communications, of the current electronic communications corpus, to which the corresponding category is assigned. The method further includes selecting, based on the corresponding quantity for each of the corresponding categories, a subset of the set of categories. Selecting the subset of the set of categories includes omitting an omitted category, of the set of categories, from the subset based on the corresponding quantity, for the omitted category, failing to satisfy one or more thresholds. The method can further include, in response to the user accessing a GUI for rendering the electronic communications of the current electronic communications corpus, causing selectable elements corresponding to the subset of the set of categories to be rendered at the GUI of the application. The selectable elements are rendered at the GUI based on selecting the subset and the selectable elements corresponding to the subset, and the selectable elements are rendered at the GUI without any rendering of an alternative selectable element corresponding to the omitted category. The method further includes determining that the user selected a selectable element, of the selectable elements, that corresponds to a particular category of the subset and causing, in response to the user selecting the selectable element, additional selectable elements to be rendered. The additional selectable elements are rendered at the GUI and correspond to the electronic communications, of the electronic communications corpus, to which the particular category is assigned.

These and other implementations of the technology disclosed herein can include one or more of the following features.

In some implementations, the electronic communications are emails.

In some implementations, the method further includes determining that the corresponding quantity for a first category of the subset is greater than the corresponding quantity for a second category of the subset. In some of those implementations, causing the selectable elements corresponding to the subset of the set of categories to be rendered at the GUI of the application includes causing a first selectable element, of the selectable elements, that corresponds to the first category to be prioritized in the rendering over a second selectable element, of the selectable elements, that corresponds to the second category. Such prioritizing of the rendering is responsive to determining that the corresponding quantity for the first category is greater than that corresponding quantity for the second category. In some versions of those implementations, causing the first selectable element to be prioritized in the rendering over the second selectable element includes causing the first selectable element to be rendered in the GUI positionally above the second selectable element, causing the first selectable element to be rendered in the GUI positionally to the left of the second selectable element, and/or causing the first selectable element to be rendered in the GUI larger than the second selectable element.

In some implementations, the one or more thresholds include an absolute threshold and/or a relative threshold. In some of those implementations, the threshold includes a relative threshold that is relative to one or more of the corresponding quantities for other of the corresponding categories. In some versions of those implementations, selecting, based on the corresponding quantity for reach of the corresponding categories, the subset includes: identifying a display quantity, N, that specifies a maximum quantity of categories for display in the GUI; and selecting, from the set of categories, the N categories with the largest corresponding quantities.

In some implementations, the method further includes, subsequent to causing the additional selectable elements to be rendered: processing new electronic communications of the current electronic communications corpus; assigning, based on the processing, a corresponding category, of the set of categories, to each of the new electronic communications; determining, for each of the corresponding categories, an updated corresponding quantity of the electronic communications, of the current electronic communications corpus, to which the corresponding category is assigned; selecting, based on the updated corresponding quantity for each of the corresponding categories, an updated subset of the set of categories, where the updated subset differs from the subset; and in response to the user accessing the GUI for rendering the electronic communications of the current electronic communications corpus: causing updated selectable elements corresponding to the updated subset of the set of categories to be rendered at the GUI of the application. The updated selectable elements are rendered at the GUI based on selecting the updated subset and the updated selectable elements corresponding to the updated subset. Further, the selectable elements are rendered at the GUI without any rendering of any alternative selectable elements corresponding to the categories, of the set of categories, not included in the updated subset.

In some implementations, the method further includes, subsequent to causing the additional selectable elements to be rendered and subsequent to deletion of a plurality of the electronic communications from the current electronic communications corpus: determining, for each of the corresponding categories, an updated corresponding quantity of the electronic communications, of the current electronic communications corpus, to which the corresponding category is assigned; selecting, based on the updated corresponding quantity for each of the corresponding categories, an updated subset of the set of categories, wherein the updated subset differs from the subset; and in response to the user accessing the GUI for rendering the electronic communications of the current electronic communications corpus: causing updated selectable elements corresponding to the updated subset of the set of categories to be rendered at the GUI of the application. The updated selectable elements are rendered at the GUI based on selecting the updated subset and the updated selectable elements corresponding to the updated subset. Further, the selectable elements are rendered at the GUI without any rendering of any alternative selectable elements corresponding to the categories, of the set of categories, not included in the updated subset.

In some implementations, selecting the subset of the set of categories includes omitting an additional omitted category, of the set of categories, from the subset based on the corresponding quantity, for the additional omitted category, failing to satisfy the one or more thresholds.

In some implementations a method implemented by hardware processor(s) is provided and includes determining, based on processing document content of documents, a set of categories for the documents. The documents are accessible to a plurality of users and the method further includes determining, for each respective document of the documents, a respective category of the set of categories that characterizes the respective document. The method further includes determining, for a particular subset of the documents that is associated with a user of the plurality of users, a hierarchy of categories that includes a subset of the set of categories. Each particular document of the particular subset of documents is assigned a respective category of the hierarchy of categories. The method further includes, in response to the user accessing the GUI of the application: causing selectable elements corresponding to the subset of the set of categories to be rendered at the GUI of the application; determining that the user selected a selectable element, of the selectable elements, corresponding to a particular category of the hierarchy of categories; and causing, in response to the user selecting the selectable element, additional selectable elements to be rendered at the GUI of the application. The additional selectable elements correspond to certain documents, of the particular subset of documents, that are assigned the particular category of the hierarchy of categories.

These and other implementations of the technology disclosed herein can include one or more of the following features.

In some implementations, determining the hierarchy of categories for the particular subset of documents includes determining that a first category in the hierarchy of categories is to be prioritized over a second category of the hierarchy of categories based on the first category being assigned to more of the documents, in the subset of the documents that is associated with the user, than is the second category. In some versions of those documents, causing the selectable elements corresponding to the subset of the set of categories to be rendered at the GUI of the application includes causing a first selectable element representing the first category to be prioritized at the GUI over a second selectable element representing the second category. In some of those versions, the method further includes, subsequent to causing the first selectable element to be prioritized at the GUI over the second selectable element: determining that the user provided one or more inputs to the application that caused the first category to be assigned to less of the documents, in the subset of the documents that is associated with the user, than is the second category; and causing, in response to the user providing the one or more inputs and in response to determining that the first category is assigned to less of the documents, in the subset of the documents, than is the second category, the second selectable element to be prioritized over the first selectable element at the GUI. In some additional or alternative of those versions, the method further includes, subsequent to causing the first selectable element to be prioritized at the GUI over the second selectable element: determining that the user provided one or more inputs to the application that caused the first category to be assigned to less than a threshold quantity of the documents in the subset of documents; and causing, in response to the user providing the one or more inputs and in response to determining that the first category is assigned to less than the threshold quantity of the documents in the subset of documents, the first selectable element to be omitted from the GUI.

In some implementations, determining the hierarchy of categories for the particular subset of documents includes determining to include each category in the hierarchy of categories based on determining that the category has been assigned to at least a threshold quantity of the documents of the particular subset of documents.

In some implementations, processing the document content includes using clustering to determine a quantity of categories to include in the set of categories. In some versions of those implementations, processing the document content further includes using natural language understanding to determine a unique label for each category of the quantity of categories. In some of those versions, the selectable element rendered at the GUI indicates a particular unique label for the particular category.

In some implementations, the additional selectable elements are omitted from the GUI prior to the user selecting the selectable element.

In some implementations, the method further includes determining, for an additional subset of the documents that is associated with an additional user of the plurality of users, an additional hierarchy of categories that includes an additional subset of the set of categories. The additional subset varies from the subset and each additional document of the additional subset of documents is assigned a respective category of the hierarchy of additional categories. In those implementations, the method further includes, in response to the additional user accessing the GUI of an additional instance of the application, causing additional selectable elements corresponding to the additional subset of the set of categories to be rendered at the GUI of the additional instance of the application.

In some implementations a method implemented by hardware processor(s) is provided and includes processing, using one or more trained machine learning models, information that is based on multiple different files. The multiple different files are accessible to a user via a GUI of an application. The method further includes generating, based on processing the information, a first category label for a first file of the multiple different files and a second category label, that is different than the first category label, for a second file of the multiple different files. The method further includes, in response to the user interacting with the application and subsequent to generating the first category label and the second category label, determining that the first file is related to the second file based on an interaction between the user and the application. The interaction involves the user accessing the first file via an interface of the application. The method further includes causing, based on determining the first file is related to the second file, the first file to be assigned the second category label instead of the first category label.

These and other implementations of the technology disclosed herein can include one or more of the following features.

In some implementations, the first file and the second file are emails. In some of those implementations, determining that the first file is related to the second file based on the interaction includes determining that the user responded to the first file with responsive content that is related to other content of the second file.

In some implementations, the first file and the second file are webpages. In some of those implementations, determining that the first file is related to the second file based on the interaction includes determining that the user selected the first file from a list of web search results and that content of the first file is related to the second category label for the second file.

In some implementations, the first file and the second file are documents and, optionally, the application is a cloud-based word processing application. In some of those implementations, determining that the first file is related to the second file based on the interaction includes determining that the user added, via the cloud-based word processing application and to the first file, content that is related to the second category label for the second file.

In some implementations, processing the information that is based on the multiple different files includes: generating a first embedding in latent space based on processing the first file using a machine learning model of the one or more machine learning models; generating a second embedding in the latent space based on processing the second file using the machine learning model; and mapping, in the latent space, the first embedding and the second embedding in furtherance of determining category labels for the first file and the second file. In some versions of those implementations, a mapping of the first embedding in the latent space is modified in response to the user at least accessing the first file via an interface of the application.

In some additional or alternative versions, determining that the first file is related to the second file based on an interaction between the user and the application includes determining that a distance, in the latent space, between the first embedding and the second embedding, or the first embedding and a second category label embedding, satisfies a threshold for assigning the second category label to the first file.

I claim:

1. A method implemented by one or more processors, the method comprising:

processing electronic communications of a current electronic communications corpus of a particular user;

assigning, based on the processing, a corresponding category, of a set of categories, to each of the electronic communications;

determining, for each of the corresponding categories, a corresponding quantity of the electronic communications, of the current electronic communications corpus, to which the corresponding category is assigned;

selecting, based on the corresponding quantity for each of the corresponding categories, a subset of the set of categories, wherein selecting the subset of the set of categories comprises:

omitting an omitted category, of the set of categories, from the subset based on the corresponding quantity, for the omitted category, failing to satisfy one or more thresholds;

in response to the user accessing a graphical user interface (GUI) for rendering the electronic communications of the current electronic communications corpus:

causing selectable elements corresponding to the subset of the set of categories to be rendered at the GUI of the application, wherein the selectable elements are rendered at the GUI based on selecting the subset and the selectable elements corresponding to the subset, and wherein the selectable elements are rendered at the GUI without any rendering of an alternative selectable element corresponding to the omitted category;

determining that the user selected a selectable element, of the selectable elements, that corresponds to a particular category of the subset; and causing, in response to the user selecting the selectable element, additional selectable elements to be rendered, at the GUI, that correspond to the electronic communications, of the electronic communications corpus, to which the particular category is assigned.

2. The method of claim 1, wherein the electronic communications are emails.

3. The method of claim 1, further comprising:
   determining that the corresponding quantity for a first category of the subset is greater than the corresponding quantity for a second category of the subset;
   wherein causing the selectable elements corresponding to the subset of the set of categories to be rendered at the GUI of the application comprises:
      causing a first selectable element, of the selectable elements, that corresponds to the first category to be prioritized in the rendering over a second selectable element, of the selectable elements, that corresponds to the second category.

4. The method of claim 3, wherein causing the first selectable element to be prioritized in the rendering over the second selectable element comprises:
   causing the first selectable element to be rendered in the GUI positionally above the second selectable element,
   causing the first selectable element to be rendered in the GUI positionally to the left of the second selectable element, and/or
   causing the first selectable element to be rendered in the GUI larger than the second selectable element.

5. The method of claim 1, wherein the one or more thresholds include an absolute threshold.

6. The method of claim 1, wherein the one or more thresholds include a relative threshold.

7. The method of claim 6, wherein the relative threshold is relative to one or more of the corresponding quantities for other of the corresponding categories.

8. The method of claim 7, wherein selecting, based on the corresponding quantity for reach of the corresponding categories, the subset comprises:
   identifying a display quantity, N, that specifies a maximum quantity of categories for display in the GUI; and
   selecting, from the set of categories, the N categories with the largest corresponding quantities.

9. The method of claim 1, further comprising, subsequent to causing the additional selectable elements to be rendered:
   processing new electronic communications of the current electronic communications corpus;
   assigning, based on the processing, a corresponding category, of the set of categories, to each of the new electronic communications;
   determining, for each of the corresponding categories, an updated corresponding quantity of the electronic communications, of the current electronic communications corpus, to which the corresponding category is assigned;
   selecting, based on the updated corresponding quantity for each of the corresponding categories, an updated subset of the set of categories, wherein the updated subset differs from the subset;
   in response to the user accessing the GUI for rendering the electronic communications of the current electronic communications corpus:
      causing updated selectable elements corresponding to the updated subset of the set of categories to be rendered at the GUI of the application,
         wherein the updated selectable elements are rendered at the GUI based on selecting the updated subset and the updated selectable elements corresponding to the updated subset, and
         wherein the selectable elements are rendered at the GUI without any rendering of any alternative selectable elements corresponding to the categories, of the set of categories, not included in the updated subset.

10. The method of claim 1, further comprising, subsequent to causing the additional selectable elements to be rendered and subsequent to deletion of a plurality of the electronic communications from the current electronic communications corpus:
    determining, for each of the corresponding categories, an updated corresponding quantity of the electronic communications, of the current electronic communications corpus, to which the corresponding category is assigned;
    selecting, based on the updated corresponding quantity for each of the corresponding categories, an updated subset of the set of categories, wherein the updated subset differs from the subset; and
    in response to the user accessing the GUI for rendering the electronic communications of the current electronic communications corpus:
       causing updated selectable elements corresponding to the updated subset of the set of categories to be rendered at the GUI of the application,
          wherein the updated selectable elements are rendered at the GUI based on selecting the updated subset and the updated selectable elements corresponding to the updated subset, and
          wherein the selectable elements are rendered at the GUI without any rendering of any alternative selectable elements corresponding to the categories, of the set of categories, not included in the updated subset.

11. The method of claim 1, wherein selecting the subset of the set of categories comprises:
    omitting an additional omitted category, of the set of categories, from the subset based on the corresponding quantity, for the additional omitted category, failing to satisfy the one or more thresholds.

12. A method implemented by one or more processors, the method comprising:
    determining, based on processing document content of documents, a set of categories for the documents,
       wherein the documents are accessible to a plurality of users;
    determining, for each respective document of the documents, a respective category of the set of categories that characterizes the respective document;
    determining, for a particular subset of the documents that is associated with a user of the plurality of users, a hierarchy of categories that comprises a subset of the set of categories,
       wherein each particular document of the particular subset of documents is assigned a respective category of the hierarchy of categories; and
    in response to the user accessing the GUI of the application:
       causing selectable elements corresponding to the subset of the set of categories to be rendered at the GUI of the application,
       determining that the user selected a selectable element, of the selectable elements, corresponding to a particular category of the hierarchy of categories, and
       causing, in response to the user selecting the selectable element, additional selectable elements to be rendered at the GUI of the application,
          wherein the additional selectable elements correspond to certain documents, of the particular subset of documents, that are assigned the particular category of the hierarchy of categories.

13. The method of claim 12, wherein determining the hierarchy of categories for the particular subset of documents includes:
determining that a first category in the hierarchy of categories is to be prioritized over a second category of the hierarchy of categories based on the first category being assigned to more of the documents, in the subset of the documents that is associated with the user, than is the second category.

14. The method of claim 13, wherein causing the selectable elements corresponding to the subset of the set of categories to be rendered at the GUI of the application includes:
causing a first selectable element representing the first category to be prioritized at the GUI over a second selectable element representing the second category.

15. The method of claim 14, further comprising:
subsequent to causing the first selectable element to be prioritized at the GUI over the second selectable element:
determining that the user provided one or more inputs to the application that caused the first category to be assigned to less of the documents, in the subset of the documents that is associated with the user, than is the second category, and
causing, in response to the user providing the one or more inputs and in response to determining that the first category is assigned to less of the documents, in the subset of the documents, than is the second category, the second selectable element to be prioritized over the first selectable element at the GUI.

16. The method of claim 14, further comprising:
subsequent to causing the first selectable element to be prioritized at the GUI over the second selectable element:
determining that the user provided one or more inputs to the application that caused the first category to be assigned to less than a threshold quantity of the documents in the subset of documents, and
causing, in response to the user providing the one or more inputs and in response to determining that the first category is assigned to less than the threshold quantity of the documents in the subset of documents, the first selectable element to be omitted from the GUI.

17. The method of claim 12, wherein determining the hierarchy of categories for the particular subset of documents includes:
determining to include each category in the hierarchy of categories based on determining that the category has been assigned to at least a threshold quantity of the documents of the particular subset of documents.

18. The method of claim 12, wherein processing the document content includes using clustering to determine a quantity of categories to include in the set of categories.

19. The method of claim 18,
wherein processing the document content further includes using natural language understanding to determine a unique label for each category of the quantity of categories, and
wherein the selectable element rendered at the GUI indicates a particular unique label for the particular category.

20. A system comprising:
memory storing instructions; and
one or more processors operable to execute the instructions to:
process electronic communications of a current electronic communications corpus of a particular user;
assign, based on the processing, a corresponding category, of a set of categories, to each of the electronic communications;
determine, for each of the corresponding categories, a corresponding quantity of the electronic communications, of the current electronic communications corpus, to which the corresponding category is assigned;
select, based on the corresponding quantity for each of the corresponding categories, a subset of the set of categories, wherein in selecting the subset of the set of categories one or more of the processors are to:
omit an omitted category, of the set of categories, from the subset based on the corresponding quantity, for the omitted category, failing to satisfy one or more thresholds;
in response to the user accessing a graphical user interface (GUI) for rendering the electronic communications of the current electronic communications corpus:
cause selectable elements corresponding to the subset of the set of categories to be rendered at the GUI of the application,
wherein the selectable elements are rendered at the GUI based on selecting the subset and the selectable elements corresponding to the subset, and
wherein the selectable elements are rendered at the GUI without any rendering of an alternative selectable element corresponding to the omitted category;
determine that the user selected a selectable element, of the selectable elements, that corresponds to a particular category of the subset; and
cause, in response to the user selecting the selectable element, additional selectable elements to be rendered, at the GUI, that correspond to the electronic communications, of the electronic communications corpus, to which the particular category is assigned.

* * * * *